United States Patent
Tarlazzi et al.

(10) Patent No.: US 11,291,010 B2
(45) Date of Patent: Mar. 29, 2022

(54) DETECTING TRAFFIC LOAD FOR A TELECOMMUNICATIONS SYSTEM USING NARROWBAND SIGNAL MONITORING

(71) Applicant: CommScope Technologies LLC, Hickory, NC (US)

(72) Inventors: Luigi Tarlazzi, Bagnacavallo (IT); Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 86 days.

(21) Appl. No.: 15/304,047

(22) PCT Filed: Apr. 14, 2015

(86) PCT No.: PCT/US2015/025771
§ 371 (c)(1),
(2) Date: Oct. 13, 2016

(87) PCT Pub. No.: WO2015/160821
PCT Pub. Date: Oct. 22, 2015

(65) Prior Publication Data
US 2017/0041936 A1    Feb. 9, 2017

Related U.S. Application Data

(60) Provisional application No. 61/980,728, filed on Apr. 17, 2014.

(51) Int. Cl.
*H04W 72/04* (2009.01)
*H04B 17/318* (2015.01)
*H04W 24/08* (2009.01)

(52) U.S. Cl.
CPC ...... *H04W 72/0486* (2013.01); *H04B 17/318* (2015.01); *H04W 24/08* (2013.01);
(Continued)

(58) Field of Classification Search
CPC ... H04B 17/318; H04W 24/08; H04W 72/048
See application file for complete search history.

(56) References Cited

U.S. PATENT DOCUMENTS

2001/0016497 A1 *  8/2001  Al-Housami ......... H04W 16/00
                                                  455/452.2
2005/0058230 A1 *  3/2005  Thomas ................. H04B 1/10
                                                     375/347

(Continued)

FOREIGN PATENT DOCUMENTS

EP        3243085       11/2017
WO       2014022211      2/2014

OTHER PUBLICATIONS

International Search Authority, "International Search Report and Written Opinion for PCT Application No. PCT/US2015/025771", dated Jun. 29, 2015, pp. 1-9, Published in: WO.

(Continued)

*Primary Examiner* — Kevin M Cunningham
(74) *Attorney, Agent, or Firm* — Fogg & Powers LLC

(57) ABSTRACT

A traffic load can be determined in a telecommunications system using narrowband signal monitoring. Narrowband signals can be generated from a wideband uplink signal. A resource utilization profile can be estimated for a remote unit based on measured power profiles associated with the narrowband signals. Traffic load can be determined based on the resource utilization profile.

15 Claims, 4 Drawing Sheets

(52) U.S. Cl.
CPC ...... *H04W 72/048* (2013.01); *H04W 72/0446* (2013.01); *H04W 72/0453* (2013.01)

(56) References Cited

U.S. PATENT DOCUMENTS

| | | | |
|---|---|---|---|
| 2008/0075033 A1 | 3/2008 | Shattil | |
| 2009/0067479 A1* | 3/2009 | Li | H04B 1/406 375/219 |
| 2010/0020235 A1* | 1/2010 | Bouillet | H04N 5/21 348/500 |
| 2010/0215089 A1* | 8/2010 | Osumi | H04B 17/102 375/224 |
| 2011/0077001 A1* | 3/2011 | Brown | H04W 24/00 455/426.1 |
| 2011/0092231 A1* | 4/2011 | Yoo | H04B 1/7097 455/501 |
| 2011/0105184 A1 | 5/2011 | Piirainen et al. | |
| 2013/0040683 A1 | 2/2013 | Siomina et al. | |
| 2103/0040683 | 2/2013 | Siomina et al. | |
| 2013/0135994 A1* | 5/2013 | Michel | H04W 52/0206 370/229 |
| 2014/0011496 A1 | 1/2014 | Elliott et al. | |
| 2014/0024402 A1 | 1/2014 | Singh | |

OTHER PUBLICATIONS

European Patent Office, "Extended European Search Report for EP Application No. 15780462.6", "Foreign Counterpart to U.S. Appl. No. 15/304,047", dated Oct. 25, 2017, pp. 1-9, Published in: EP.

IP Australia, "Examination Report No. 1 for AU Application No. 2015247794 dated Jul. 12, 2018" From Foreign Counterpart of U.S. Appl. No. 15/304,047; pp. 1-4; Published in AU.

European Patent Office; Communication Pursuant to Article 94(3) from EP Application No. 15780462.6 dated Dec. 7, 2018; From Foreign Counterpart of U.S. Appl. No. 15/304,047; pp. 1-6; Published in EP.

Australian Government IP Australia, "Examination Report from AU Application No. 2015247794 dated Dec. 19, 2018", from Foreign Counterpart to PCT Application No. PCT/US2015/025771, dated Dec. 19, 2018, pp. 1-3, Published AU.

Australian Government IP Australia, "Notice of acceptance for patent application from AU Application No. 2015247794 dated Feb. 13, 2019", from Foreign Counterpart to U.S. Appl. No. 15/304,047, pp. 1-3, Published AU.

European Patent Office, "Communication pursuant to Article 94(3) from EP Application No. 15780462.6 dated Jul. 25, 2019", from Foreign Counterpart to U.S. Appl. No. 15/304,047, pp. 1-5, Published: EP.

European Patent Office, "Communication pursuant to Article 94(3) EPC from EP Application No. 15780462.6", from Foreign Counterpart to U.S. Appl. No. 15/304,047, dated Jun. 19, 2020, pp. 1 through 6, Published: EP.

European Patent Office, "Communication pursuant to Article 94(3) EPC from EP Application No. 15780462.6", from Foreign Counterpart to U.S. Appl. No. 15/304,047, dated Apr. 22, 2021, pp. 1 through 5, Published: EP.

European Patent Office, "Communication pursuant to Article 94(3) from EP Application No. 15780462.6", from Foreign Counterpart to U.S. Appl. No. 15/304,047, dated Jan. 2, 2020, pp. 1-5, Published: EP.

Hejazi et al., "Traffic Monitoring in a LTE Distributed Antenna System", Cyber Journals Multidisciplinary Journals in Science and Technology, May 2013, pp. 19-25, vol. 3, Issue 5, Journal of Selected Areas in Telecommunications (JSAT).

* cited by examiner

DETECTING TRAFFIC LOAD FOR A TELECOMMUNICATIONS SYSTEM USING NARROWBAND SIGNAL MONITORING

CROSS-REFERENCE TO RELATED APPLICATION

This application is a U.S. National Stage application of PCT Application Serial No. PCT/US2015/025771, filed Apr. 14, 2015, and titled "DETECTING TRAFFIC LOAD FOR A TELECOMMUNICATIONS SYSTEM USING NARROWBAND SIGNAL MONITORING", which claims the benefit of U.S. Provisional Application Ser. No. 61/980,728, filed Apr. 17, 2014, and titled "Detecting Traffic Load for a Telecommunications System Using Narrowband Signal Monitoring," the contents of all of which are incorporated herein by reference.

TECHNICAL FIELD

The present disclosure generally relates to telecommunications systems and more particularly (though not necessarily exclusively) to detecting traffic loads using narrowband signal monitoring.

BACKGROUND

A distributed antenna system ("DAS") can provide a signal transport network for communicating signals between a base transceiver station and mobile communication devices. The DAS can include one or more master units and remote units. The master unit can be coupled to a base transceiver station using radio frequency cables. The base transceiver station can send downlink signals for receipt by the mobile communication devices. The master unit can receive downlink signals from the base transceiver station and distribute the downlink signals to one or more remote units. The remote units can transmit downlink signals to mobile communication devices within the coverage area that each remote unit services. The mobile communication devices can send uplink signals to the base transceiver station. The remote units can receive uplink signals from the mobile communication devices within respective coverage areas. The remote units can combine the uplink signals and transmit the combined uplink signals to the master unit. The master unit can transmit the uplink signals to the base transceiver station.

A base transceiver station can allocate time and frequency channel resources in a given cell in a coverage area, but no information may be available to the base transceiver station about the utilization of channel resources at the individual remote unit level.

SUMMARY

According to one aspect of the present disclosure, a wideband uplink signal is decomposed into narrowband signals. Power profiles associated with the narrowband signals are determined. A resource utilization profile at each remote unit is estimated. A traffic load at each remote unit is determined.

According to another aspect of the present disclosure, a system includes one or more remote units and a monitoring unit. The monitoring unit can include a receiver for receiving narrowband signals generated from a wideband uplink signal. The monitoring unit can further include a processor for determining a power profile for each narrowband signal and estimating a resource utilization information profile at each of the remote units. The processor can determine a traffic load based on the estimated resource utilization profile.

According to another aspect of the disclosure, a monitoring unit can include a receiver and a processor. The receiver can receive narrowband signals. The processor can determine a power profile for each narrowband signal and estimate a resource utilization information profile at each of the remote units. The processor can also determine a traffic load based on the estimated resource utilization profile.

These illustrative aspects and features are provided not to define or limit the present disclosure, but to provide examples to aid understanding the concepts disclosed herein. Other aspects, advantages, and features of the present disclosure will become apparent upon full review.

DETAILED DESCRIPTION

Certain aspects and features relate to detecting a traffic load by monitoring one or more narrowband signals. In some aspects, a wideband uplink signal can be decomposed into one or more narrowband signals. A resource utilization profile comprising time and frequency resource utilization information of the used uplink radio channel can be estimated at each remote unit based on information extracted from and associated with the narrowband signals generated from a wideband uplink signal. Based on the resource utilization profile, a traffic load can be determined at each remote unit.

In digital communications systems, a repeater can include a device that receives a digital signal on an electromagnetic or optical transmission medium and regenerates the signal along a next segment of the medium. A distributed antenna system (DAS) can include a type of digital repeater that can use mediums such as fiber optic or copper cables. For purposes of illustration, a DAS will be used throughout as an example of a digital repeater suitable for detecting traffic load by monitoring one or more narrowband signals, but other types of telecommunication systems can be used.

A remote unit can include circuitry that can be coupled to an antenna element. Alternatively, the remote unit can include an antenna element. The remote units can transmit uplink signals to the master unit. The master unit can combine uplink signals received from remote units for transmission to the base transceiver station. A base transceiver station can be configured to reallocate resources optimally based on the spatial distribution of the traffic load for each remote unit in the DAS. For example, the organization of remote units and cells can be adjusted based on the detected traffic load for each remote unit. The simulcast factor can be reduced for high-load cells and the simulcast factor can be increased for low-load cells. In another example, additional cells associated with different radio frequency ("RF") carriers can be designated to be associated with high-load remote units. Optimizing the traffic load based on measured power spectral density profiles of narrowband signals can reduce or improve the efficiency of radio link budgets. Because remote units with a low load can use less frequency resources, the available composite transmit power can be used on a narrower bandwidth and the transmitted power spectral density can be increased.

These illustrative examples are given to introduce the reader to the general subject matter discussed here and are not intended to limit the scope of the disclosed concepts. The following sections describe various additional features and examples with reference to the drawings, but, like the illustrative examples, should not be used to limit the present disclosure.

Figure 1:
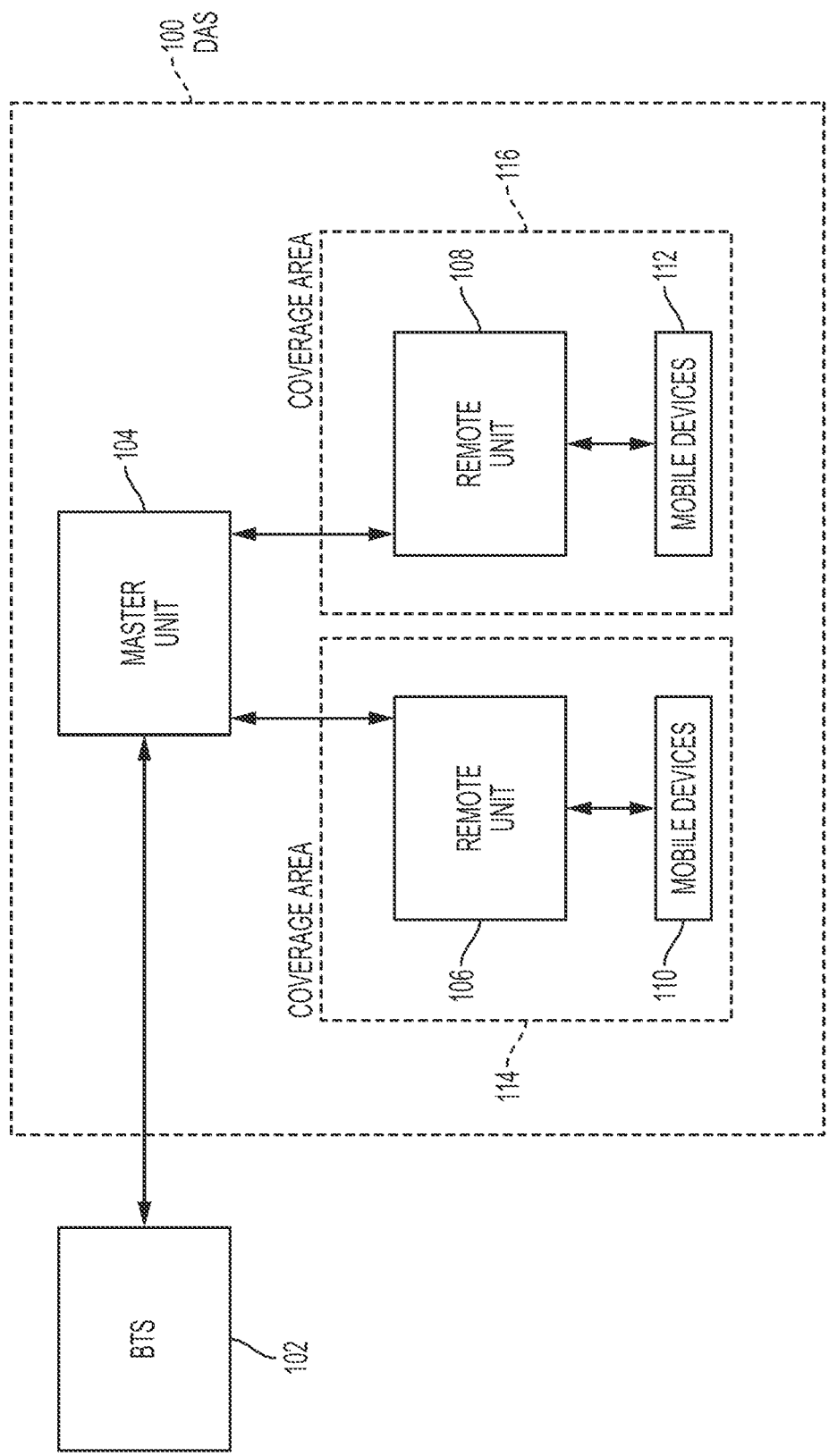
FIG. 1 is a block diagram depicting a telecommunications system according to one example of the present disclosure.

FIG. 1 illustrates a telecommunications system suitable for implementing an aspect of the present disclosure. The system can include a DAS 100 coupled to a base transceiver station 102. The DAS 100 can include a master unit 104 and remote units 106, 108. Each remote unit 106, 108 can transmit information to and receive information from mobile communication devices 110, 112 within the respective coverage area 114, 116 of each remote unit 106, 108. Although two remote units are shown, any number of remote units, including one, can be used. Similarly, although one master unit is shown, any number of master units can be used. The DAS 100 can be communicatively coupled to the base transceiver station 102 using, for example, radio frequency cables between the base transceiver station 102 and master unit 104 in the DAS 100. In other examples, the DAS 100 is communicatively coupled to the base transceiver station 102 by a wireless link.

In the downlink path, the channel resource utilization profile can be the same for each remote unit in the DAS due to a downlink single simulcast. For example, the DAS master unit 104 can split the RF signals for each RF carrier associated with a given cell supported by the base transceiver station. The same RF signal of a given cell can be split into multiple signal copies that can be distributed to multiple remote units. In one aspect, the signal copies can be distributed according to a simulcast factor. The simulcast factor can be defined, for example, by the number of remote units radiating the same cell signals. The base transceiver station can allocate time and frequency channel resources in a given cell.

In the uplink path, the channel resource utilization profile can vary substantially across different remote units. For example, channel resource utilization can vary as a function of the distribution of active mobile communication devices transmitting uplink signals throughout the coverage areas served by the remote units. The DAS can monitor the resource utilization profile for each remote unit to determine the traffic load of a given cell in the coverage area served by the respective remote units. The resource utilization profile can be monitored anywhere in the DAS (e.g., at the remote unit level, at the master unit level, at the base station, etc.).

Figure 2:
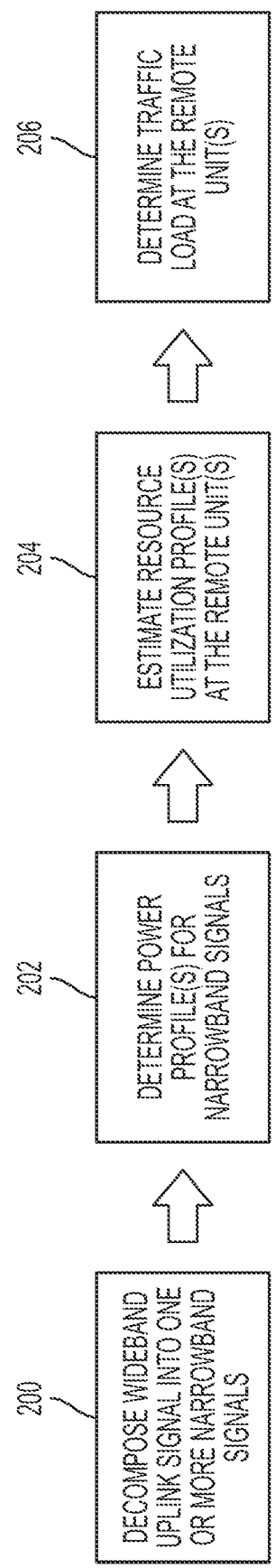
FIG. 2 is a flow chart depicting a process for detecting traffic load for a telecommunications system using narrowband signal monitoring according to one example of the present disclosure.

FIG. 2 is a flow chart showing examples of a process for detecting traffic load for a telecommunications system using narrowband signal monitoring. At block 200, a wideband uplink signal can be decomposed into one or more complex narrowband signals (e.g., I/Q samples, where "I" and "Q" can correspond to the real and imaginary parts of the signal, respectively). The sample rate of each complex narrowband signals is decimated to the minimum acceptable value. In some aspects, the multiple narrowband signals can be generated using filter banks. For example, each carrier can be processed by a filter bank having a specific narrowband filters grid. The frequency resolution of the filter bank can be dimensioned according to the carrier format of the specific uplink signal (e.g., LTE, GSM, etc.). In other aspects, where filter banks may not be used for decomposing the uplink signal, narrowband signals can be generated, for example, by sampling signal information from the uplink signal and performing off-channel-path processing.

Information regarding the number of carrier frequencies, channel bandwidth and format served by each remote unit in the DAS can be available during the system configuration phase. For example, with respect to LTE SC-FDMA uplink signals, the per-user frequency resource allocation can be 180 kHz, which can correspond to a single physical resource block (PRB). The individual bandwidth of each narrowband signal can be in the same order to reduce the effects of energy spillover from user devices operating adjacent in frequency. With respect to GSM uplink signals, TDMA can scheme over a single 200 kHz carrier and FDMA can scheme over different carriers using frequency hopping. Each GSM carrier of 200 kHz bandwidth can be accommodated with a filter bank having this frequency resolution. With respect to UMTS uplink signals, the nominal channel bandwidth can be 5 MHz (e.g., 3.84 MHz+roll-off). When a CDMA scheme for user-resource allocation is used over the entire channel bandwidth, a higher frequency resolution can be used to estimate resources assigned to each user.

At block 202, a power profile can be determined for the narrowband signals. In some aspects, the power profile for each carrier can include determining the square of the momentary power of each narrowband signal (e.g., adding the square of the I and Q samples of the complex narrowband signals).

At block 204, a resource utilization profile can be estimated. The estimation can be based on a resource allocation map over time and frequency. Time and frequency resource utilization information includes information extracted from the narrowband signals and information defined by a signal format associated with the narrowband signals. For example, the power profile for samples of the narrowband profiles can be stored in a database. The power profile of the samples versus the frequency of the carrier and the sample time can yield a resource allocation map of the remote units over time and frequency.

For each sample time, the square of the I and Q samples of the complex narrowband signals can be added together. The result can be the square of the power of the signal over a particular time and frequency bin. The collections of square power values can represent the resource utilization profile over the time and the frequency with a time resolution equal to the sample time and a frequency resolution equal to the narrowband filters grid. The calculated square power values can be averaged over the time and frequency domain according to the signal format known by the system.

At block 206, a traffic load can be determined based on the estimated resource utilization profile. Active resources, whether in the frequency domain, time domain, or both, can indicate whether a user signal is being transported by a remote unit in the DAS. All of the narrowband signals having an estimated resource utilization profile at or above a predetermined threshold can be assumed to carry traffic load and can be marked as active. All of the narrowband signals having an estimated resource utilization profile lower than a predetermined threshold can be assumed to carry only noise, so can be marked as inactive.

In some aspects, the predetermined threshold for determining whether narrowband signals are active or inactive can be based on the power profile of the noise floor measured at non-loaded traffic conditions when no traffic is being transmitted through the DAS (e.g., at the commissioning of the system). Alternatively, a RUM can measure narrowband signals which are not transporting traffic load at a given point in time. The noise floor calibration can be applied to the signal formats processed by the RUM of each remote unit. The noise floor can be a reference for discriminating between "active" and "inactive" resources during a given time period. The start of the time period can be triggered when the first narrow band signal is detected as "active." The traffic activity can be measured as a percentage of resource usage versus the total available resources. In LTE and GSM, the frequency resources that are in use per remote unit can be determined over time and frequency. Using the specific frequency resources that are in use per remote unit over time and frequency can provide more precise measurement results than using a long-term power measurement because imperfections in power control for the user device may not affect the power measurement. Long-term power measurements can be available, for example, in UMTS embodiments.

In UMTS, the composite power profile generated by active user devices in the cell can be estimated. The admission/congestion control procedure of the base transceiver station can be configured to ensure that a maximum received total wideband power ("RTWP") is not exceeded. For example, configuring the base transceiver station to ensure that a maximum RTWP is not exceeded can include limiting the maximum number of user devices attached to the cell. After determining values for the maximum RTWP level (e.g., defined by the base transceiver station at full load), the measured noise floor calibration level, and the measured power density (e.g., as rise over thermal noise power), the percentage of resource usage versus full load condition can be estimated.

For LTE, the number of active user devices per time slot can be estimated by measuring the number of active physical resource blocks over the total number of physical resource blocks determined to be "active". Assuming a non-adjacent frequency allocation for the users, different groups of active physical resource blocks allocated to a specific user can be identified. The number of user devices per time slot can be computed by dividing the total number of "active" physical resource blocks by the number of identified physical resource block groups. A physical resource block can be a minimum resource assigned to a user.

Once the traffic load on the remote units is detected, traffic load optimization policies can be applied by the base transceiver station. For example, the simulcast factor of the cells distributed through the DAS can be modified and more carrier frequencies can be allocated to remote units reporting high traffic load. By allocating more carrier frequencies to high-load remote units, the traffic load per carrier for a given remote unit can be reduced. A base transceiver station can allocate all resources to a user device if that user device is the only one communicating in the DAS. Rather than measuring the number of user devices directly, the system can measure the load and optimize accordingly.

Figure 3:
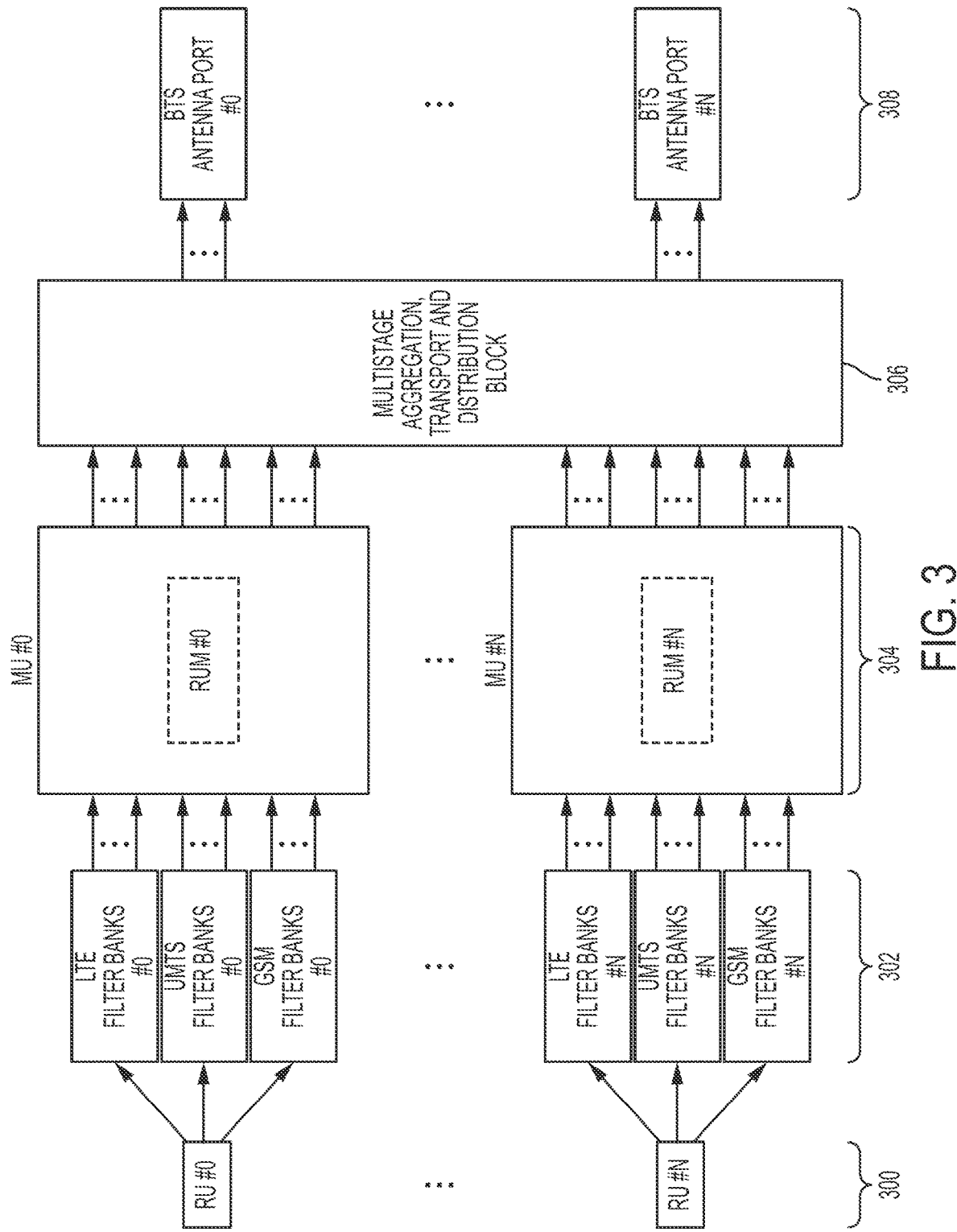
FIG. 3 is a functional block diagram depicting a distributed antenna system for detecting traffic load using narrowband signal monitoring according to one example of the present disclosure.

FIG. 3 is a diagram illustrating a DAS suitable for detecting traffic load by monitoring narrowband signals. One or more DAS remote units 300, labeled RU #0 through RU #N, can communicate multi-carrier RF uplink signals. The uplink signals may be decomposed into multiple narrowband complex signals (I/Q samples) using filter banks 302. Separate filter banks can be configured to decompose uplink signals having like signal formats. For example, LTE SC-FDMA uplink signals received by the remote unit can be decomposed by a multi-carrier LTE filter bank (e.g., LTE Filter Bank #0 for RU #0, LTE Filter Bank #N for DAS RU #N). UMTS uplink signals received by the remote unit can be decomposed by a multi-carrier UMTS filter bank (e.g., UMTS Filter Bank #0 for RU #0, UMTS Filter Bank #N for remote unit RU #N). GSM uplink signals received by the remote unit can be decomposed by a multi-carrier GSM filter bank (e.g., GSM Filter Bank #0 for RU #0, GSM Filter Bank #N for RU #N).

The process of decomposing multicarrier RF uplink signals into multiple narrowband complex signals can be applied to any uplink carrier format and frequency. In some aspects, each carrier signal can, alternatively, be processed by a filter bank having a narrowband filter grid designed for a specified carrier. In some aspects, the narrowband signals that are outputted by the filter bank(s) may not need to be grouped by format. For example, the narrowband signals used to determine a power profile can be ungrouped (e.g., one signal per power profile) or can be grouped based on other characteristics (e.g., grouped by carrier).

The collection of I/Q samples generated by the filter banks 302 can be sent to one or more master units 304. In some aspects, each master unit, MU #0 through MU #N, can include a resource utilization monitor ("RUM"), RUM #0 through RUM #N, that is configured to receive, monitor (or process), and transmit the narrowband complex signals generated from the uplink signals. Specifically, a RUM can be configured to receive the narrowband complex signals and determine a power profile for each of the narrowband complex signals. In some configurations, narrowband signals of the same carrier or carrier signal format can, alternatively, be processed together to determine the respective power profile for each carrier or format. The RUM is further configured to estimate time and frequency channel resource utilization information of the radio channel at the remote units. A resource utilization profile of the radio channel can be determined based on the measured power profiles associated with the narrowband signals and the time and frequency for each carrier. The RUM determines a traffic load based on the resource utilization profile. This information can be fed into a multistage, aggregation, transport and distribution block 306. At the output of the multistage, aggregation, transport and distribution block 306, the signal carrying the information can be routed to the antenna ports 308 servicing the base transceiver stations BTS #0 through BTS #N.

A RUM can be located anywhere in the DAS. For example, the functionality of the RUM can be integrated into a remote unit, a master unit, or an expansion unit. For example, as illustrated above, the RUM integrated into a master unit. The receiver and transmitter functions can, in some aspects, utilize the receiving and transmitting means of the unit into which it is integrated. In some aspects, the functionality of the RUM can be distributed throughout the DAS without departing from the scope of the subject matter described herein.

Figure 4:
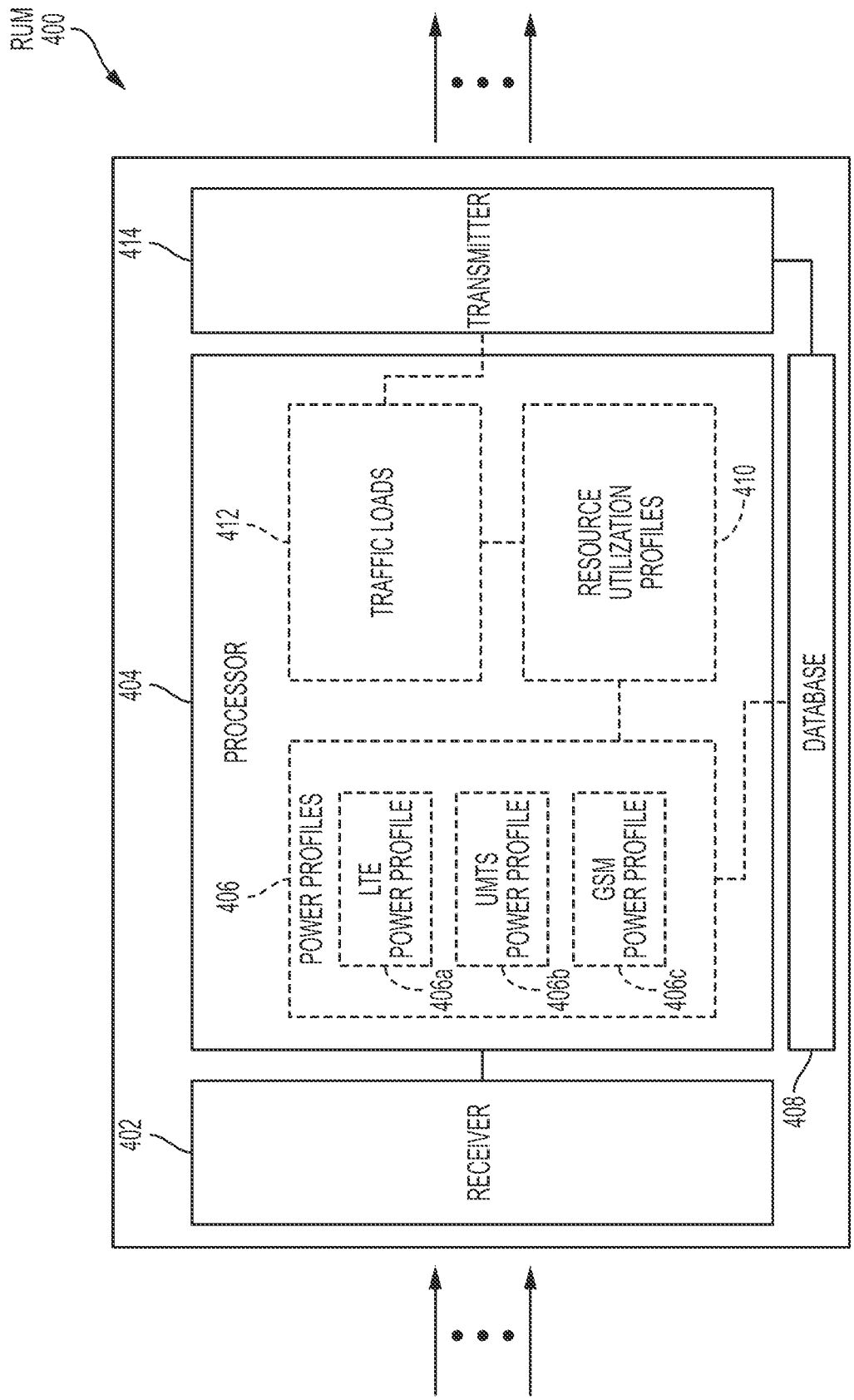
FIG. 4 is a functional block diagram depicting a resource utilization monitor according to one example of the present disclosure.

FIG. 4 is a functional block diagram of a RUM according to one example. The RUM 400 can include a receiver 402 and a processor 404 to receive and process, respectively, narrowband signals (e.g., I/Q samples) generated from uplink signals. In some aspects, the processor 404 can process common signal formats (e.g., LTE, UMTS, GSM) together. A power profile 406 can be determined for each grouping of I/Q samples. For example, the processor 404 can determine an LTE Power Profile 406a for the LTE narrowband signals received, a UMTS Power Profile 406b for the UMTS narrowband signals received, and a GSM Power Profile 406c for the GSM narrowband signals received. In some aspects, each power profile 406 can be stored in a database 408 in the RUM. A resource utilization profile 410 is estimated for each remote unit based on the power profiles 406. A traffic load is determined from the resource utilization profile 410. The traffic load information is transmitted by a transmitter 414 to the base transceiver station of the DAS through the transport network as a part of control messaging.

Returning to FIG. 3 to illustrate how a RUM 400 may operate within the DAS, resources utilization monitor RUM #0 can process the narrowband I/Q samples generated from the uplink signals received from remote unit RU #0. RUM #0 can estimate the resource utilization profile for RU #0 based on a power profile of the narrowband I/Q samples from remote unit RU #0. RUM #0 can determine a traffic load based on the estimated resource utilization profile and transmit the traffic load information to one or more of the BTS antenna ports 308. The traffic load information is transmitted to an antenna port 308 of a base transceiver station that can optimize the traffic load by reallocating resources within the DAS.

Resources for a given carrier can be assigned in the frequency and time domains. A RUM 400 can determine a power profile 406 per sample time and in the time domain. The RUM 400 can apply a different monitoring function to power profiles 406 related to different signal formats, depending on the time domain characteristics of the received signal frame. Power profiles 406 calculated at each sample time can be averaged over a time window that is equal to the time resolution in order to correspond to changes in the resource allocation applied to each specific carrier format. In some aspects, the frequency resolution of the power profile 406 can be defined by the filter bank resolution. By calculating power profiles 406 at each sample time and averaging over a time window, the power profile 406 of each carrier can be estimated in the either or both of the frequency and time domains.

For example, in GSM, a burst period can be defined to be 0.577 msec. A time division multiple access ("TDMA") frame includes eight burst periods. The GSM frequency-hopping rate corresponds to the TDMA framing. One TDMA frame can be 4.615 msec. The time resolution of the power profile can be at least equal to the GSM burst. For UMTS, the frame duration is 10 msec, but the shortest time transmit interval (TTI) for resource scheduling can be 2 msec. Time slot resolution of the power profile can be at least equal to the TTI duration for each UMTS carrier. For LTE, the physical resource block duration can be equal to a time slot of 0.5 msec. Time slot resolution of the power profile can be at least equal to the physical resource block duration for each LTE carrier.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A method, comprising:
   decomposing a wideband uplink signal, received by one or more remote units of a distributed antenna system, into one or more narrowband signals;
   determining a power profile for each of the one or more narrowband signals;
   estimating a resource utilization profile for each of the one or more narrowband signals for each of the one or more remote units based, at least in part, on the power profile for each of the one or more narrowband signals;
   determining a traffic load at each of the one or more remote units based on the resource utilization profile by:
   comparing the resource utilization profile for each of the one or more narrowband signals of a remote unit to a predetermined threshold that is based on a power profile of a noise floor for the remote unit measured when no traffic is transmitted;
   designating as active narrowband signals of the remote unit having the estimated resource utilization profile at or above the predetermined threshold; and
   designating as inactive narrowband signals of the remote unit having the estimated resource utilization profile below the predetermined threshold; and
   causing an adjustment of a resource allocation for at least one of (a) the one or more remote units and (b) at least one cell, the adjustment based upon the determined traffic loads.

2. The method of claim 1, wherein decomposing the wideband uplink signal into the one or more narrowband signals includes using at least one filter bank tuned to a predetermined set of time and frequency characteristics.

3. The method of claim 1, wherein decomposing the wideband uplink signal into the one or more narrowband signals includes sampling the wideband uplink signal and performing off-channel-path signal processing to generate the one or more narrowband signals.

4. The method of claim 1, further comprising:
   generating digital samples of the one or more narrowband signals; and
   filtering the digital samples based on a signal format associated with the one or more narrowband signals.

5. The method of claim 1, wherein determining the power profile for each of the one or more narrowband signals includes:
   sampling the one or more narrowband signals; and
   determining a square of a momentary power for the one or more narrowband signals at each sample time.

6. The method of claim 1, wherein estimating the resource utilization profile for each of the one or more remote units comprises:
   storing the power profile for samples of each of the one or more narrowband signals in a database; and
   deriving a resource allocation map from the power profile for the samples for each of the one or more narrowband signals, frequency characteristics of the samples for each of the one or more narrowband signals, and a sample time of the samples for each of the one or more narrowband signals.

7. The method of claim 1, further comprising optimizing the traffic load by:
   allocating greater frequency or time resources to each of the one or more remote units having the resource utilization profile at or above the predetermined threshold; and allocating fewer frequency or time resources to each of the one or more remote units having the resource utilization profile below the predetermined threshold.

8. A distributed antenna system comprising:
one or more remote units, where each remote unit comprises circuitry coupled to an antenna; and
a monitoring unit comprising:
   a receiver configured for receiving one or more narrowband signals generated from a wideband uplink signal received by at least one of the one or more remote units, and
   processor circuitry, coupled to the receiver, configured for:
      determining a power profile for each of the one or more narrowband signals,
      estimating a resource utilization profile for each of the one or more narrowband signals for each of the one or more remote units based, at least in part, on the power profile for each of the one or more narrowband signals,
      determining a traffic load at each of the one or more remote units based on the resource utilization profile by:
         comparing the resource utilization profile for each of the one or more narrowband signals of a remote unit to a predetermined threshold that is based on a power profile of a noise floor for the remote unit measured when no traffic is transmitted;
         designating as active narrowband signals of the remote unit having the estimated resource utilization profile at or above the predetermined threshold; and
         designating as inactive narrowband signals of the remote unit having the estimated resource utilization profile below the predetermined threshold, and
      causing an adjustment of a resource allocation for at least one of (a) the one or more remote units and (b) at least one cell, based upon the determined traffic loads.

9. The distributed antenna system of claim 8, wherein the monitoring unit further comprises a transmitter configured for transmitting information based on the traffic load at each of the one or more remote units to a base transceiver station.

10. The distributed antenna system of claim 8, further comprising one or more filter banks configured for decomposing the wideband uplink signal into the one or more narrowband signals.

11. The distributed antenna system of claim 8, further comprising a database configured for storing the power profile for samples of each of the one or more narrowband signals,
wherein the processor circuitry is further configured to derive a resource allocation map, at least in part, from information stored in the database.

12. The distributed antenna system of claim 8, wherein the processor circuitry is further configured to determine the power profile for each of the one or more narrowband signals by sampling the one or more narrowband signals and determining a square of a momentary power for the one or more narrowband signals at each sample time.

13. A monitoring unit comprising:
   a receiver configured for receiving one or more narrowband signals generated from a signal received by one or more remote units, wherein each of the one or more remote units comprises respective circuitry coupled to a respective antenna; and
   processor circuitry, coupled to the receiver, configured to:
   determine a power profile for each of the one or more narrowband signals, to:
      estimate a resource utilization profile for each of the one or more narrowband signals for each of the one or more remote units based, at least in part, on the power profile for each of the one or more narrowband signals,
      determine a traffic load at each of the one or more remote units based on the resource utilization profile by:
         comparing the resource utilization profile for each of the one or more narrowband signals of a remote unit to a predetermined threshold that is based on a power profile of a noise floor for the remote unit measured when no traffic is transmitted;
         designating as active narrowband signals of the remote unit having the estimated resource utilization profile at or above the predetermined threshold; and
         designating as inactive narrowband signals of the remote unit having the estimated resource utilization profile below the predetermined threshold, and
      cause an adjustment of a resource allocation for at least one of (a) the one or more remote units and (b) at least one cell, the adjustment based upon the determined traffic loads.

14. The monitoring unit of claim 13, further comprising a transmitter configured for transmitting traffic load information to a base transceiver station configured to optimize the traffic load based, at least in part, on the traffic load information.

15. The monitoring unit of claim 13, further comprising a transmitter configured to transmit traffic load information to a base transceiver station configured to optimize the traffic load based, at least in part, on the traffic load information, the traffic load information being measured as a percentage of resource usage to at least one of the one or more remote units versus a total of available resources to the at least one of the one or more remote units.

* * * * *